(12) United States Patent
Graves et al.

(10) Patent No.: US 11,667,186 B2
(45) Date of Patent: Jun. 6, 2023

(54) SAFEGUARDING A VEHICLE'S INPUT LINE ASSEMBLY

(71) Applicant: Toyota Motor Engineering & Manufacturing North America, Inc., Plano, TX (US)

(72) Inventors: William F. Graves, Ann Arbor, MI (US); Chase A. Young, Ann Arbor, MI (US)

(73) Assignee: Toyota Motor Engineering & Manufacturing Noah America, Inc., Plano, TX (US)

( * ) Notice: Subject to any disclaimer, the term of this patent is extended or adjusted under 35 U.S.C. 154(b) by 293 days.

(21) Appl. No.: 17/004,695

(22) Filed: Aug. 27, 2020

(65) Prior Publication Data
US 2022/0063397 A1  Mar. 3, 2022

(51) Int. Cl.
| B60K 15/01 | (2006.01) |
| B62D 43/08 | (2006.01) |
| B62D 21/15 | (2006.01) |
| B60K 15/063 | (2006.01) |

(52) U.S. Cl.
CPC ............ B60K 15/01 (2013.01); B62D 21/15 (2013.01); B62D 43/08 (2013.01); *B60K 2015/0638* (2013.01); *B60Y 2306/01* (2013.01)

(58) Field of Classification Search
CPC ............ B60K 15/01; B60K 2015/0638; B62D 21/15; B62D 43/08; B60Y 2306/01
See application file for complete search history.

(56) References Cited

U.S. PATENT DOCUMENTS

| 2,162,046 A | * | 6/1939 | Albinson | ............... | B62D 43/08 |
| | | | | | 296/37.2 |
| 2,246,861 A | * | 6/1941 | Slack | ..................... | B62D 43/08 |
| | | | | | 296/37.2 |
| 3,642,296 A | * | 2/1972 | Froumajou | .......... | B62D 21/152 |
| | | | | | 224/490 |

(Continued)

FOREIGN PATENT DOCUMENTS

| DE | 102015010301 A1 | | 3/2016 | | |
| FR | 3055115 A1 | * | 2/2018 | ............. | B60K 15/01 |

*Primary Examiner* — Frank B Vanaman
(74) *Attorney, Agent, or Firm* — Christopher G. Darrow; Darrow Mustafa PC (57) ABSTRACT

A vehicle includes a body including a beltline and a rear wheelhouse, an input line assembly packaged about the rear wheelhouse, a component packaged about the rear wheelhouse rearward of the input line assembly, and a spare wheel stowed rearward of the rear wheelhouse. The component is secured by a permanent beltline-side attachment and a semi-permanent rear wheelhouse-side attachment. In response to rear impact, the body is configured to allow forward movement of the spare wheel, under which the spare wheel has a trajectory relative to which the component is between the spare wheel and the input line assembly, and relative displacement between the beltline-side attachment and the rear wheelhouse-side attachment, under which the rear wheelhouse-side attachment breaks against the beltline-side attachment, and the beltline-side attachment thereafter carries the component from between the spare wheel and the input line assembly relative to the trajectory of the spare wheel.

19 Claims, 3 Drawing Sheets

(56) References Cited

U.S. PATENT DOCUMENTS

| | | | | |
|---|---|---|---|---|
| 5,992,885 | A * | 11/1999 | Fukagawa | B62D 43/04 |
| | | | | 280/830 |
| 7,677,651 | B2 * | 3/2010 | Yamaguchi | B62D 25/2027 |
| | | | | 296/187.11 |
| 2006/0028042 | A1 | 2/2006 | Maeshima et al. | |
| 2009/0140014 | A1 | 6/2009 | Sawauchi | |
| 2015/0360727 | A1 * | 12/2015 | Miwa | B60K 15/01 |
| | | | | 280/124.109 |
| 2019/0010904 | A1 * | 1/2019 | Sasaki | F02M 37/007 |
| 2019/0023116 | A1 * | 1/2019 | Yokota | B60H 1/3225 |
| 2019/0337568 | A1 * | 11/2019 | Spurling | B62D 25/082 |

* cited by examiner

SAFEGUARDING A VEHICLE'S INPUT LINE ASSEMBLY

TECHNICAL FIELD

The embodiments disclosed herein generally relate to safeguarding a vehicle's input line assembly and, more particularly, to a vehicle whose input line assembly is safeguarded from damage under forward movement of a spare wheel against the input line assembly through an in-between component.

BACKGROUND

Vehicles commonly include items packaged within their sides. For instance, for many vehicles, it is known to package input line assemblies (e.g., fill tube assemblies or charge cable assemblies) within their sides. Moreover, for some vehicles, it may be desirable to package certain components (e.g., electronic control units (ECUs)) within their sides. Vehicles also commonly include spare wheels. Moreover, the same vehicles also commonly have cargo areas. For these vehicles, to offer convenient user-accessibility from the cargo areas, it may be desirable to stow spare wheels alongside their sides.

However, when a vehicle includes an input line assembly packaged within one of its sides, the combination of packaging a component within the same side rearward of the input line assembly, and stowing a spare wheel alongside the same side rearward of both the input line assembly and the component, raises issues concerning forward movement of the spare wheel when the vehicle experiences rear impact. Specifically, under forward movement thereof, the spare wheel might have a trajectory relative to which the component is between the spare wheel and the input line assembly, raising the prospect of the input line assembly being damaged under forward movement of the spare wheel against the input line assembly through the component.

SUMMARY

Disclosed herein are embodiments of a vehicle whose input line assembly is safeguarded from damage under forward movement of a spare wheel against the input line assembly through an in-between component. In one aspect, the vehicle includes a body with a side including a beltline and a rear wheelhouse, an input line assembly packaged within the side about the rear wheelhouse, a component packaged within the side about the rear wheelhouse rearward of the input line assembly, and a spare wheel stowed alongside the side rearward of the rear wheelhouse. The component is secured by a permanent beltline-side attachment and a semi-permanent rear wheelhouse-side attachment. In response to rear impact, the body is configured to allow forward movement of the spare wheel, under which the spare wheel has a trajectory relative to which the component is between the spare wheel and the input line assembly, and relative displacement between the beltline-side attachment and the rear wheelhouse-side attachment, under which the rear wheelhouse-side attachment breaks against the beltline-side attachment, and the beltline-side attachment thereafter carries the component from between the spare wheel and the input line assembly relative to the trajectory of the spare wheel. This and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a vehicle that includes a body with a side including a beltline and a rear wheelhouse, an input line assembly packaged within the side about the rear wheelhouse, a component packaged within the side about the rear wheelhouse rearward of the input line assembly, and a spare wheel stowed alongside the side rearward of the rear wheelhouse. In response to rear impact, the body is configured to allow forward movement of the spare wheel. Under forward movement thereof, the spare wheel has a trajectory relative to which the component is between the spare wheel and the input line assembly. To safeguard the input line assembly from damage under forward movement of the spare wheel against the input line assembly through the component, the component is secured by a permanent beltline-side attachment and a semi-permanent rear wheelhouse-side attachment. Moreover, in response to rear impact, in addition to forward movement of the spare wheel, the body is configured to allow relative displacement between the beltline-side attachment and the rear wheelhouse-side attachment. Under relative displacement therebetween, the rear wheelhouse-side attachment breaks against the beltline-side attachment, and the beltline-side attachment thereafter carries the component from between the spare wheel and the input line assembly relative to the trajectory of the spare wheel.

A representative passenger vehicle 100 is shown in FIGS. 1A, 1B, 1C and 1D. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "transverse," "inner," "inward," "outer," "outward" and the like refer to the lateral directions of the vehicle 100.

The vehicle 100 has an exterior and a number of interior compartments. The compartments include a passenger compartment 102, an engine compartment 104 and, in the illustrated minivan configuration of the vehicle 100, a cargo area 106. The vehicle 100 has a body 108 that forms the exterior and defines the compartments. The body 108 has two upright sides 110, and a horizontal floor 112, a horizontal roof 114 and an upright rear end 116 extending between the sides 110. One side 110 is shown, with the other side 110 being a mirror image. This description follows with reference to one side 110. However, it will be understood that this disclosure is applicable in principle to the other side 110.

Figure 1A:
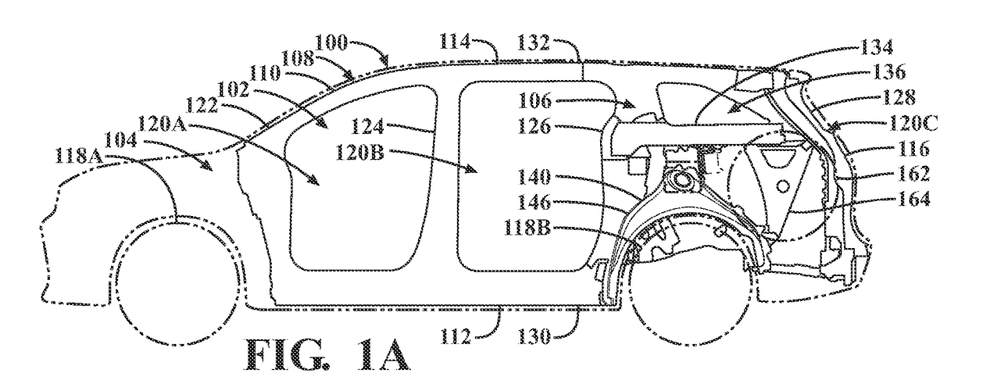
FIGS. 1A and 1B are side views of a vehicle whose outline is rendered with phantom lines and whose body is partially rendered with solid lines, from outside looking inward with a rear quarter panel removed for better viewing, and from inside looking outward with the rear quarter panel in place, respectively, showing a side including a beltline and a rear wheelhouse, and a spare wheel stowed alongside the side rearward of the rear wheelhouse.
Figure 1B:
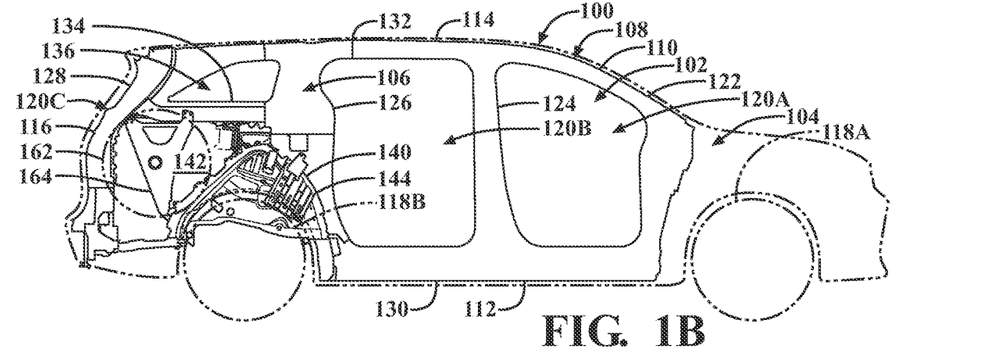

The vehicle 100 may include, among other things, seats and a dash assembly housed in the passenger compartment 102. Additionally, the vehicle 100 may include any combination of an engine, one or more motors, a transmission and other powertrain components housed in the engine compartment 104, underneath the floor 112 or elsewhere in the vehicle 100. Among the other powertrain components, the vehicle 100 includes wheels 118. The wheels 118 support the remainder of the vehicle 100 on the ground. The vehicle 100 includes four wheels 118, two of which are front wheels 118A, and two of which are rear wheels 118B. One front wheel 118A and one rear wheel 118B are shown, with the other front wheel 118A and the other rear wheel 118B being mirror images. One, some or all of the wheels 118 are powered by the remainder of the powertrain components to drive the vehicle 100 along the ground.

The body 108 is constructed from rigidly interconnected pillars, rails and like frame members, overlying body panels and other body elements, as well as any combination of overlying paneling, trim, upholstery and other body coverings. The body elements may have any combination of fabricated, bent, stamped, extruded, casted, molded and like constructions, and may be made from any combination of one or more metallic materials and one or more polymeric materials.

The body 108 defines a number of door openings 120 that open between the compartments and the exterior. Relatedly, the body 108 may include a number of doors corresponding to the door openings 120. The doors may serve as closure panels for the compartments. The doors may be pivotally, slidingly or otherwise connected to the remainder of the body 108 for movement, relative to the corresponding door openings 120, between closed positions and open positions. In the closed positions, the doors may be positioned over the corresponding door openings 120, with the periphery of the doors adjacent to the surrounding body 108. In the open positions, the doors may be positioned away from the corresponding door openings 120, which allows ingress into, egress out of and like access to the compartments.

As part of the side 110, the body 108 includes an upright A-pillar 122, an upright B-pillar 124, an upright C-pillar 126 and an upright D-pillar 128, as well as a horizontal floor rail 130, a horizontal roof rail 132 and a horizontal beltline 134. The A-pillar 122, the B-pillar 124, the C-pillar 126 and the D-pillar 128 are longitudinally spaced apart from one another, with the B-pillar 124 rearward of the A-pillar 122, the C-pillar 126 rearward of the B-pillar 124, and the D-pillar 128 rearward of the C-pillar 126. The floor rail 130, the beltline 134 and the roof rail 132 are vertically spaced apart from one another, with the beltline 134 above the floor rail 130 and below the roof rail 132. The floor rail 130 extends longitudinally between the A-pillar 122, the B-pillar 124, the C-pillar 126 and the D-pillar 128. At the floor rail 130, the side 110 shares a longitudinal junction with the floor 112. The roof rail 132 extends longitudinally between the A-pillar 122, the B-pillar 124, the C-pillar 126 and the D-pillar 128. At the roof rail 132, the side 110 shares a longitudinal junction with the roof 114. From between the floor rail 130 and the roof rail 132, the beltline 134 extends longitudinally between the C-pillar 126 and the D-pillar 128.

At the side 110, the body 108 defines a front door opening 120A between the A-pillar 122 and the B-pillar 124, and a rear door opening 120B between the B-pillar 124 and the C-pillar 126. Relatedly, as part of the side 110, the body 108 may include an upright front door corresponding to the front door opening 120A, and an upright rear door corresponding to the rear door opening 120B. In the illustrated minivan configuration of the vehicle 100, the front door may be pivotally connected to the remainder of the body 108, and the rear door may be slidingly connected to the remainder of the body 108. Moreover, the body 108 defines a rear window opening 136 between the C-pillar 126 and the D-pillar 128 above the beltline 134. Relatedly, the body 108 may include a rear window corresponding to the rear window opening 136. Moreover, between the sides 110, the body 108 defines a cargo door opening 120C between the D-pillars 128. Relatedly, as part of the rear end 116, the body 108 may include an upright cargo door corresponding to the cargo door opening 120C. In the illustrated minivan configuration of the vehicle 100, the cargo door may be pivotally connected to the remainder of the body 108.

As part of the side 110, the body 108 also includes an upright rear wheelhouse 140 for the rear wheel 118B, and an upright rear quarter panel 142. The rear wheelhouse 140 and the beltline 134 are vertically spaced apart from one another, with the rear wheelhouse 140 below the beltline 134. From below the beltline 134, the rear wheelhouse 140 extends longitudinally from the C-pillar 126 toward the D-pillar 128, and defines a downward facing space for housing the rear wheel 118B. The rear quarter panel 142 contiguously outwardly overlies the C-pillar 126, the D-pillar 128 and the beltline 134, and covers the space between the C-pillar 126 and the D-pillar 128 below the beltline 134 and above the rear wheelhouse 140. As shown, the rear wheelhouse 140 includes an upright inner wheelhouse panel 144 and an upright outer wheelhouse panel 146. The inner wheelhouse panel 144 and the outer wheelhouse panel 146 are laterally opposed with one another, and share a longitudinal junction with one another atop the rear wheelhouse 140. At the inner wheelhouse panel 144, the rear wheelhouse 140 shares a longitudinal junction with the floor 112. At the outer wheelhouse panel 146, the rear wheelhouse 140 shares a longitudinal junction with the rear quarter panel 142.

Figure 1C:
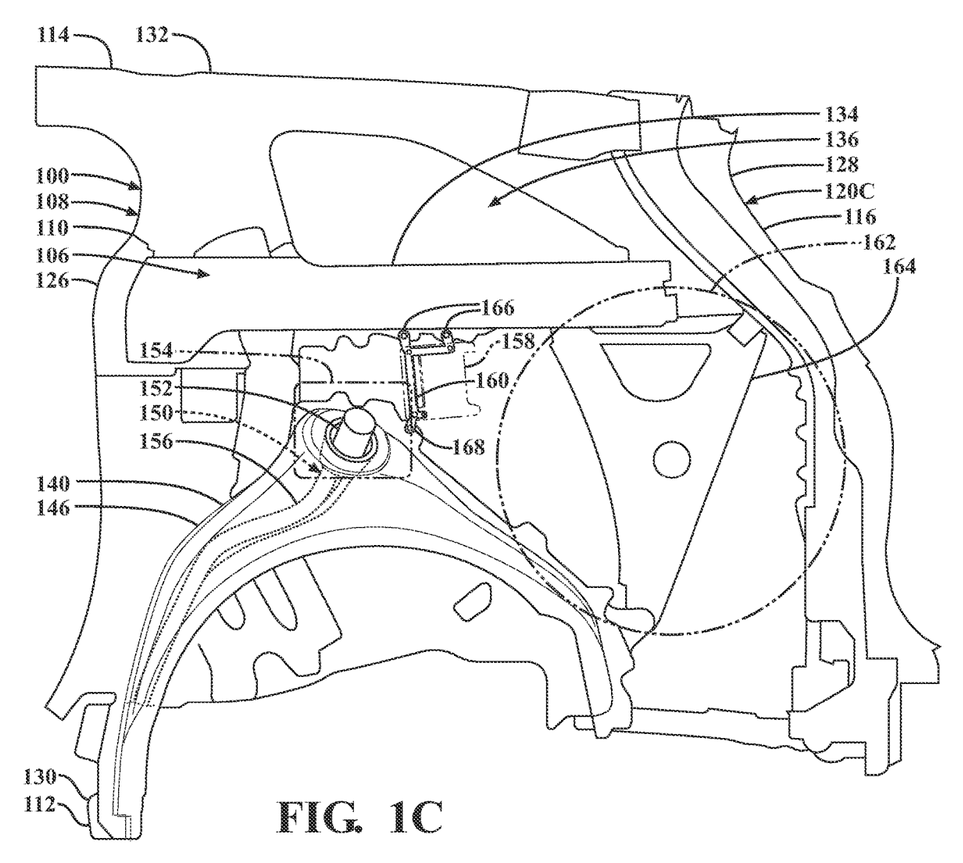
FIGS. 1C and 1D are partial side views of the vehicle according to FIGS. 1A and 1B, respectively, further showing an input line assembly packaged within the side about the rear wheelhouse, and a component packaged within the side about the rear wheelhouse rearward of the input line assembly, with the component secured by a permanent beltline-side attachment and a semi-permanent rear wheelhouse-side attachment.
Figure 1D:
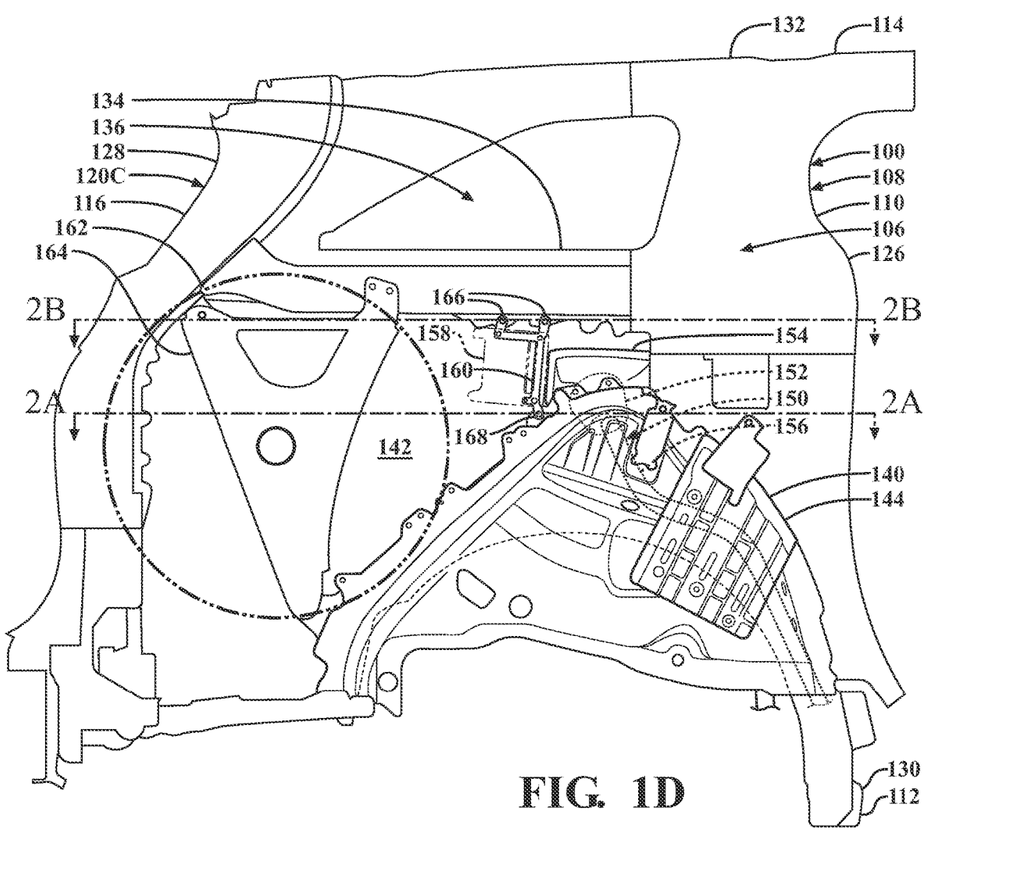

As shown with particular reference to FIGS. 1C and 1D, the vehicle 100 includes an input line assembly 150 for inputting energy into the vehicle 100. The input line assembly 150 is packaged, in relevant part, within the side 110 about the rear wheelhouse 140. As part of the input line assembly 150, the vehicle 100 includes an input interface 152, an input interface housing 154 for the input interface 152, and an input line 156 routed from the input interface 152. From atop or otherwise about the rear wheelhouse 140, the input interface housing 154 is secured to the rear quarter panel 142, and defines a lidded, outward facing space opening from the rear quarter panel 142. The input interface 152 is housed within the input interface housing 154. From the input interface 152, the input line 156 is routed out of the input interface housing 154, between the input interface housing 154 and the rear wheelhouse 140, and into the rear wheelhouse 140 at the outer wheelhouse panel 146. Moreover, from within the rear wheelhouse 140, the input line 156 is routed along the rear wheelhouse 140 toward the floor 112, and, ultimately, to an energy storage element housed underneath the floor 112 or elsewhere in the vehicle 100. In an engine-powered implementation of the vehicle 100, the input line assembly 150 may, for instance, be a fill tube assembly for inputting fuel into the vehicle 100, with the input interface 152 being a fill neck, the input interface housing 154 being a fill neck housing for the fill neck, and the input line 156 being a fill tube routed to a fuel tank. Additionally, or alternatively, in a motor-powered implementation of the vehicle 100, the input line assembly 150 may, for instance, be a charge cable assembly for inputting electricity into the vehicle 100, with the input interface 152 being a charge port, the input interface housing 154 being a charge port housing for the charge port, and the input line 156 being a charge cable routed to a battery.

In addition to the input line assembly 150, the vehicle 100 includes a component 158. The component 158 is packaged within the side 110 about the rear wheelhouse 140 rearward of the input line assembly 150. In relation to the component 158, the vehicle 100 also includes a component bracket 160 for the component 158. Similarly to the component 158, the component bracket 160 is packaged within the side 110 about the rear wheelhouse 140 rearward of the input line assembly 150. From within the side 110, the component bracket 160 and the component 158 are laterally opposed with one another, with the component bracket 160 secured to the side 110, and the component 158 secured to the side 110 on the component bracket 160. From atop or otherwise about the rear wheelhouse 140, the component bracket 160 extends below the beltline 134 and above the rear wheelhouse 140, and is secured to the beltline 134 and the rear wheelhouse 140. Moreover, the component 158 is secured to the component bracket 160, and, by extension, to the beltline 134 and the rear wheelhouse 140 on the component bracket 160. The component 158 may be thus packaged within the side 110 in the absence of readier packaging space elsewhere in the vehicle 100. In one implementation, the component 158 is an electronic control unit (ECU).

In addition to the input line assembly 150 and the component 158, the vehicle 100 includes a spare wheel 162. The spare wheel 162 is stowed alongside the side 110 rearward of the rear wheelhouse 140, and, by extension, rearward of both the input line assembly 150 and the component 158. In relation to the spare wheel 162, the vehicle 100 also includes a spare wheel support 164 for the spare wheel 162. Similarly to the spare wheel 162, the spare wheel support 164 is packaged within the side 110 rearward of the rear wheelhouse 140. The spare wheel support 164, from within the side 110, and the spare wheel 162, from alongside the side 110, are laterally opposed with one another, with the spare wheel support 164 secured to the side 110, and the spare wheel 162 secured to the side 110 on the spare wheel support 164. From rearward of the rear wheelhouse 140, the spare wheel support 164 extends below the beltline 134 and above the rear wheelhouse 140, and is secured to the beltline 134 and the rear wheelhouse 140. Moreover, the spare wheel 162 is secured to the spare wheel support 164, and, by extension, to the beltline 134 and the rear wheelhouse 140 on the spare wheel support 164. As thus stowed alongside the side 110, the spare wheel 162 is conveniently user-accessible from the cargo area 106. Specifically, if and when one of the wheels 118 becomes irrevocably damaged (e.g., when its tire becomes flat), users in need of a field replacement may access the cargo area 106, un-secure the spare wheel 162 from the spare wheel support 164, and remove the spare wheel 162 from the cargo area 106. In the absence of the spare wheel 162, users would have to arrange to either have a spare wheel delivered to the vehicle 100 in the field, or have the vehicle 100 towed or otherwise transported from the field to a location with a spare wheel.

The body 108 imparts structure to the vehicle 100, including when the vehicle 100 experiences rear impact, or, in other words, a longitudinal collision between the vehicle 100 and an external object at the rear end 116 of the body 108. Relatedly, when the vehicle 100 experiences rear impact, the body 108 plays a principal role in assuming associated rear impact energy on behalf of the vehicle 100. Generally speaking, the body 108 is deformation resistant, or, in other words, resistant to being deformed by rear impact. At the same time, by design, the body 108 may be otherwise deformation susceptible, or, in other words, somewhat susceptible to being deformed by rear impact. Similarly to the body 108 to which it belongs, each body element may be deformation resistant, but otherwise deformation susceptible. As the product of resisting being deformed by rear impact, the body 108 or each body element, as the case may be, generally maintains the cargo area 106. On the other hand, as the product of otherwise being deformed by rear impact, the body 108 or each body element, as the case may be, absorbs rear impact energy.

Figure 2A:
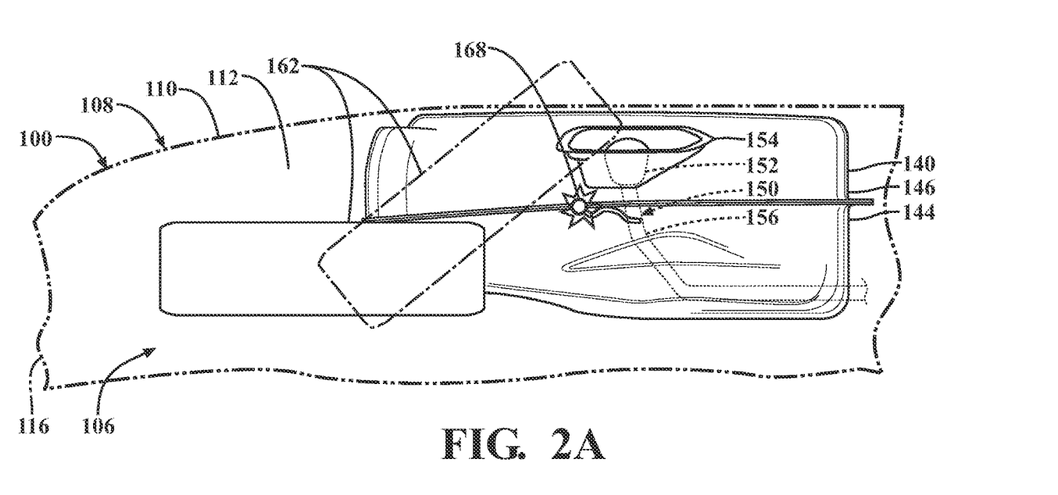
FIGS. 2A and 2B are partial top views of the body taken along the lines 2A-2A and 2B-2B in FIG. 1D, respectively, showing aspects of the response of the body to rear impact, including allowing forward movement of the spare wheel, under which the spare wheel has a trajectory relative to which the component is between the spare wheel and the input line assembly, and relative displacement between the beltline-side attachment and the rear wheelhouse-side attachment, under which the rear wheelhouse-side attachment breaks against the beltline-side attachment, and the beltline-side attachment thereafter carries the component from between the spare wheel and the input line assembly relative to the trajectory of the spare wheel.
Figure 2B:
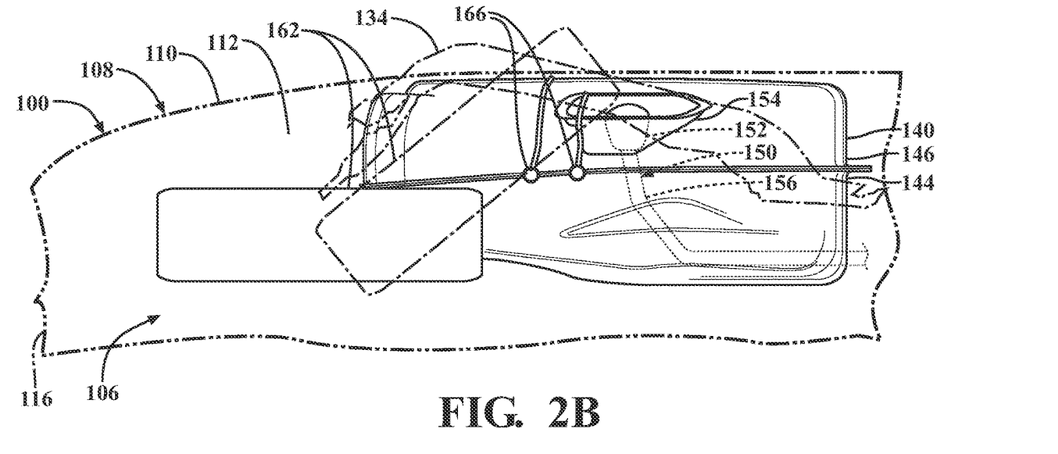

As shown with additional reference to FIGS. 2A and 2B, with the input line assembly 150 packaged within the side 110 about the rear wheelhouse 140, the combination of packaging the component 158 within the side 110 about the rear wheelhouse 140 rearward of the input line assembly 150, and stowing the spare wheel 162 alongside the side 110 rearward of the rear wheelhouse 140, rearward of both the input line assembly 150 and the component 158, raises issues concerning forward movement of the spare wheel 162 when the vehicle 100 experiences rear impact. Specifically, as shown for representative rear impact experienced by the vehicle 100, in response to rear impact, the body 108 is configured to allow forward movement of the spare wheel 162. Notably, as allowed by the body 108, forward movement of the spare wheel 162 is limited. On the one hand, the body 108 is configured to allow forward movement of the spare wheel 162 under forward movement of an external object against the spare wheel 162 through the rear end 116. On the other hand, the body 108 is configured to allow forward movement of the spare wheel 162 against one or more body elements, and, in association therewith, disallow forward movement of the spare wheel 162 directly against the input line assembly 150. Nonetheless, under forward movement thereof, the spare wheel 162 has a trajectory relative to which the component 158 is between the spare wheel 162 and the input line assembly 150, raising the prospect of the input line assembly 150 being damaged under forward movement of the spare wheel 162 against the input line assembly 150 through the component 158.

To safeguard the input line assembly 150 from such damage, the vehicle 100 includes a collaborative relationship between the securement of the component 158 to the side 110, and the response of the body 108 to rear impact, including allowing not only forward movement of the spare wheel 162, but also displacement of one or more body elements. Under the collaborative relationship, the component 158 is carried from between (i.e., from between to no longer between) the spare wheel 162 and the input line assembly 150 relative to the trajectory of the spare wheel 162, thus eliminating the prospect of forward movement of the spare wheel 162 against the input line assembly 150 through the component 158, and, by extension, the prospect of the input line assembly 150 being damaged thereunder.

As noted above, the component 158 is secured to the beltline 134 and the rear wheelhouse 140. As part of the collaborative relationship, the component 158 is secured by a permanent beltline-side attachment 166 and a semi-permanent rear wheelhouse-side attachment 168. The beltline-side attachment 166 may be a direct or indirect attachment between the component 158 and the beltline 134, and the rear wheelhouse-side attachment 168 may be a direct or indirect attachment between the component 158 and the rear wheelhouse 140. As shown, with the component 158 secured to the beltline 134 and the rear wheelhouse 140 on the component bracket 160, the beltline-side attachment 166 is an indirect attachment between the component 158 and the beltline 134, and the rear wheelhouse-side attachment 168 is an indirect attachment between the component 158 and the rear wheelhouse 140. Specifically, the beltline-side attachment 166 is an attachment between the component bracket 160 and the beltline 134, and the rear wheelhouse-side attachment 168 is an attachment between the component bracket 160 and the rear wheelhouse 140. In this and other implementations, the beltline-side attachment 166 may be a single-point attachment or a multiple-point attachment, and the rear wheelhouse-side attachment 168 may be a single-point attachment or a multiple-point attachment. As shown, to promote permanence, the beltline-side attachment 166 is a multiple-point attachment, and, to promote semi-permanence, the rear wheelhouse-side attachment 168 is a single-point attachment. Additionally, or alternatively, to promote permanence, the beltline-side attachment 166 may be rendered by one or more metallic fasteners, and, to promote semi-permanence, the rear wheelhouse-side attachment 168 may be rendered by one or more polymeric clips.

For purposes of securing the component 158 to the beltline 134 and the rear wheelhouse 140, in normal operation of the vehicle 100, neither the beltline-side attachment 166 nor the rear wheelhouse-side attachment 168 breaks. Likewise, the beltline-side attachment 166 and the rear wheelhouse-side attachment 168 together statically support the component 158. With respect to the collaborative relationship, the beltline-side attachment 166 and the rear wheelhouse-side attachment 168 principally function when, in the midst of normal operation of the vehicle 100, the vehicle 100 experiences rear impact. Specifically, as part of the collaborative relationship, in response to rear impact, in addition to forward movement of the spare wheel 162, the body 108 is configured to allow relative displacement between the beltline-side attachment 166 and the rear wheelhouse-side attachment 168. Under relative displacement therebetween, the beltline-side attachment 166 and the rear wheelhouse-side attachment 168 mutually apply force to one another. With the beltline-side attachment 166 being permanent, the beltline-side attachment 166 does not break, and, with the rear wheelhouse-side attachment 168 being semi-permanent, the rear wheelhouse-side attachment 168 breaks against the beltline-side attachment 166. Likewise, the beltline-side attachment 166 thereafter carries the component 158 from between the spare wheel 162 and the input line assembly 150 relative to the trajectory of the spare wheel 162.

As shown, relative displacement between the beltline-side attachment 166 and the rear wheelhouse-side attachment 168 includes, in relevant part, forward displacement of the rear wheelhouse-side attachment 168 relative to the beltline-side attachment 166, under which the rear wheelhouse-side attachment 168 breaks against the beltline-side attachment 166. Moreover, relative displacement between the beltline-side attachment 166 and the rear wheelhouse-side attachment 168 includes, in relevant part, subsequent forwardly-orthogonal displacement of the beltline-side attachment 166 relative to the rear wheelhouse-side attachment 168, under which the beltline-side attachment 166 thereafter forwardly-orthogonally carries the component 158 from between the spare wheel 162 and the input line assembly 150 relative to the trajectory of the spare wheel 162. Specifically, relative displacement between the beltline-side attachment 166 and the rear wheelhouse-side attachment 168 includes, in relevant part, subsequent outward displacement of the beltline-side attachment 166 relative to the rear wheelhouse-side attachment 168, under which the beltline-side attachment 166 thereafter outwardly carries the component 158 from between the spare wheel 162 and the input line assembly 150 relative to the trajectory of the spare wheel 162.

As noted above, in response to rear impact, the body 108 is configured to allow forward movement of the spare wheel 162 against one or more body elements. In relation to relative displacement between the beltline-side attachment 166 and the rear wheelhouse-side attachment 168, as part of the collaborative relationship, the body 108 is configured to allow forward movement of the spare wheel 162 against the beltline 134 and the rear wheelhouse 140. With respect to the beltline 134, with the spare wheel 162 secured to the beltline 134 on the spare wheel support 164, the body 108 is configured to allow forward movement of the spare wheel 162 against the beltline 134 through the spare wheel support 164. With respect to the rear wheelhouse 140, with the spare wheel 162 being stowed alongside the side 110 rearward of the rear wheelhouse 140, the body 108 is configured to allow forward movement of the spare wheel 162 directly against the rear wheelhouse 140. Moreover, with the spare wheel 162 secured to the rear wheelhouse 140 on the spare wheel support 164, the body 108 is configured to allow forward movement of the spare wheel 162 against the rear wheelhouse 140 through the spare wheel support 164. Under forward movement of the spare wheel 162 against the beltline 134 and the rear wheelhouse 140, the body 108 is configured to allow relative displacement between the beltline 134 and the rear wheelhouse 140. In turn, under relative displacement between the beltline 134 and the rear wheelhouse 140, the body 108 is configured to allow relative displacement between the beltline-side attachment 166 and the rear wheelhouse-side attachment 168, under which the rear wheelhouse-side attachment 168 breaks against the beltline-side attachment 166, and the beltline-side attachment 166 thereafter carries the component 158 from between the spare wheel 162 and the input line assembly 150 relative to the trajectory of the spare wheel 162.

As shown, under forward movement of the spare wheel 162 against the rear wheelhouse 140, the body 108 is configured to allow forward collapse of the rear wheelhouse 140. Moreover, under forward movement of the spare wheel 162 against the beltline 134, the body 108 is configured to allow forwardly-orthogonal buckling of the beltline 134. Specifically, the body 108 is configured to allow outward buckling of the beltline 134. In turn, under forward collapse of the rear wheelhouse 140, the body 108 is configured to allow forward displacement of the rear wheelhouse-side attachment 168 relative to the beltline-side attachment 166, under which the rear wheelhouse-side attachment 168 breaks against the beltline-side attachment 166. Moreover, under forwardly-orthogonal buckling of the beltline 134, the body 108 is configured to allow subsequent forwardly-orthogonal displacement of the beltline-side attachment 166 relative to the rear wheelhouse-side attachment 168, under which the beltline-side attachment 166 thereafter forwardly-orthogonally carries the component 158 from between the spare wheel 162 and the input line assembly 150 relative to the trajectory of the spare wheel 162. Specifically, under outward buckling of the beltline 134, the body 108 is configured to allow subsequent outward displacement of the beltline-side attachment 166 relative to the rear wheelhouse-side attachment 168, under which the beltline-side attachment 166 thereafter outwardly carries the component 158 from between the spare wheel 162 and the input line assembly 150 relative to the trajectory of the spare wheel 162.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
   a body with a side including a beltline and a rear wheelhouse;
   an input line assembly packaged within the side about the rear wheelhouse;
   a component packaged within the side about the rear wheelhouse rearward of the input line assembly; and
   a spare wheel stowed alongside the side rearward of the rear wheelhouse; wherein
   the component is secured by a permanent beltline-side attachment and a semi-permanent rear wheelhouse-side attachment; and
   in response to rear impact, the body is configured to allow forward movement of the spare wheel, under which the spare wheel has a trajectory relative to which the component is between the spare wheel and the input line assembly, and relative displacement between the beltline-side attachment and the rear wheelhouse-side attachment, under which the rear wheelhouse-side attachment breaks against the beltline-side attachment, and the beltline-side attachment thereafter carries the component from between the spare wheel and the input line assembly relative to the trajectory of the spare wheel.

2. The vehicle of claim 1, wherein the input line assembly is a fill tube assembly.

3. The vehicle of claim 1, wherein the input line assembly is a charge cable assembly.

4. The vehicle of claim 1, further comprising:
   a component bracket packaged within the side about the rear wheelhouse rearward of the input line assembly, wherein the component is secured to the component bracket, the beltline-side attachment is an attachment between the component bracket and the beltline, and the rear wheelhouse-side attachment is an attachment between the component bracket and the rear wheelhouse.

5. The vehicle of claim 1, wherein the component is an electronic control unit (ECU).

6. The vehicle of claim 1, wherein the beltline-side attachment is a multiple-point attachment.

7. The vehicle of claim 1, wherein the rear wheelhouse-side attachment is a single-point attachment.

8. The vehicle of claim 1, wherein the beltline-side attachment is a multiple-point attachment, and the rear wheelhouse-side attachment is a single-point attachment.

9. The vehicle of claim 1, wherein the beltline-side attachment is rendered by a metallic fastener.

10. The vehicle of claim 1, wherein the rear wheelhouse-side attachment is rendered by a polymeric clip.

11. The vehicle of claim 1, wherein the beltline-side attachment is rendered by a metallic fastener, and the rear wheelhouse-side attachment is rendered by a polymeric clip.

12. The vehicle of claim 1, wherein relative displacement between the beltline-side attachment and the rear wheelhouse-side attachment includes forward displacement of the rear wheelhouse-side attachment relative to the beltline-side attachment, under which the rear wheelhouse-side attachment breaks against the beltline-side attachment.

13. The vehicle of claim 1, wherein relative displacement between the beltline-side attachment and the rear wheelhouse-side attachment includes forwardly-orthogonal displacement of the beltline-side attachment relative to the rear wheelhouse-side attachment, under which the beltline-side attachment forwardly-orthogonally carries the component from between the spare wheel and the input line assembly relative to the trajectory of the spare wheel.

14. The vehicle of claim 1, wherein relative displacement between the beltline-side attachment and the rear wheelhouse-side attachment includes outward displacement of the beltline-side attachment relative to the rear wheelhouse-side attachment, under which the beltline-side attachment outwardly carries the component from between the spare wheel and the input line assembly relative to the trajectory of the spare wheel.

15. The vehicle of claim 1, wherein relative displacement between the beltline-side attachment and the rear wheelhouse-side attachment includes forward displacement of the rear wheelhouse-side attachment relative to the beltline-side attachment, under which the rear wheelhouse-side attachment breaks against the beltline-side attachment, and subsequent forwardly-orthogonal displacement of the beltline-side attachment relative to the rear wheelhouse-side attachment, under which the beltline-side attachment thereafter forwardly-orthogonally carries the component from between the spare wheel and the input line assembly relative to the trajectory of the spare wheel.

16. The vehicle of claim 1, wherein relative displacement between the beltline-side attachment and the rear wheelhouse-side attachment includes forward displacement of the rear wheelhouse-side attachment relative to the beltline-side attachment, under which the rear wheelhouse-side attachment breaks against the beltline-side attachment, and subsequent outward displacement of the beltline-side attachment relative to the rear wheelhouse-side attachment, under which the beltline-side attachment thereafter outwardly carries the component from between the spare wheel and the input line assembly relative to the trajectory of the spare wheel.

17. The vehicle of claim 1, wherein in response to rear impact, the body is configured to allow forward movement of the spare wheel against the beltline and the rear wheelhouse, under which the spare wheel has a trajectory relative to which the component is between the spare wheel and the input line assembly, relative displacement between the beltline and the rear wheelhouse under forward movement of the spare wheel against the beltline and the rear wheelhouse, and relative displacement between the beltline-side attachment and the rear wheelhouse-side attachment under relative displacement between the beltline and the rear wheelhouse, under which the rear wheelhouse-side attachment breaks against the beltline-side attachment, and the beltline-side attachment thereafter carries the component from between the spare wheel and the input line assembly relative to the trajectory of the spare wheel.

18. The vehicle of claim 1, wherein in response to rear impact, the body is configured to allow forward movement of the spare wheel against the beltline and the rear wheelhouse, under which the spare wheel has a trajectory relative to which the component is between the spare wheel and the input line assembly, forward collapse of the rear wheelhouse under forward movement of the spare wheel against the rear wheelhouse, forwardly-orthogonal buckling of the beltline under forward movement of the spare wheel against the beltline, forward displacement of the rear wheelhouse-side attachment relative to the beltline-side attachment under forward collapse of the rear wheelhouse, under which the rear wheelhouse-side attachment breaks against the beltline-side attachment, and subsequent forwardly-orthogonal displacement of the beltline-side attachment relative to the rear wheelhouse-side attachment under forwardly-orthogonal buckling of the beltline, under which the beltline-side attachment thereafter forwardly-orthogonally carries the component from between the spare wheel and the input line assembly relative to the trajectory of the spare wheel.

19. The vehicle of claim 1, wherein in response to rear impact, the body is configured to allow forward movement of the spare wheel against the beltline and the rear wheelhouse, under which the spare wheel has a trajectory relative to which the component is between the spare wheel and the input line assembly, forward collapse of the rear wheelhouse under forward movement of the spare wheel against the rear wheelhouse, outward buckling of the beltline under forward movement of the spare wheel against the beltline, forward displacement of the rear wheelhouse-side attachment relative to the beltline-side attachment under forward collapse of the rear wheelhouse, under which the rear wheelhouse-side attachment breaks against the beltline-side attachment, and subsequent outward displacement of the beltline-side attachment relative to the rear wheelhouse-side attachment under outward buckling of the beltline, under which the beltline-side attachment thereafter outwardly carries the component from between the spare wheel and the input line assembly relative to the trajectory of the spare wheel.

\* \* \* \* \*